United States Patent Office 3,242,528
Patented Mar. 29, 1966

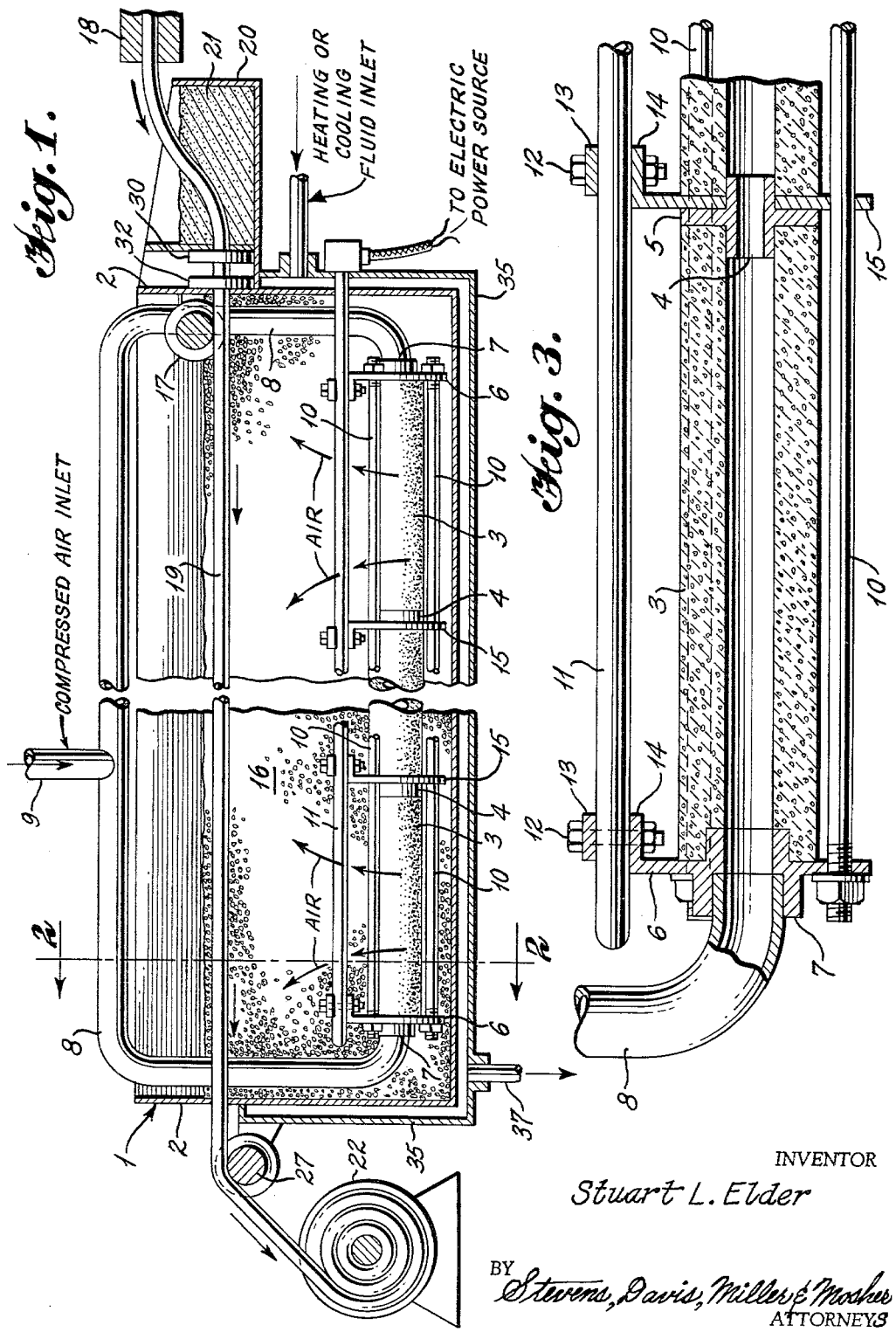

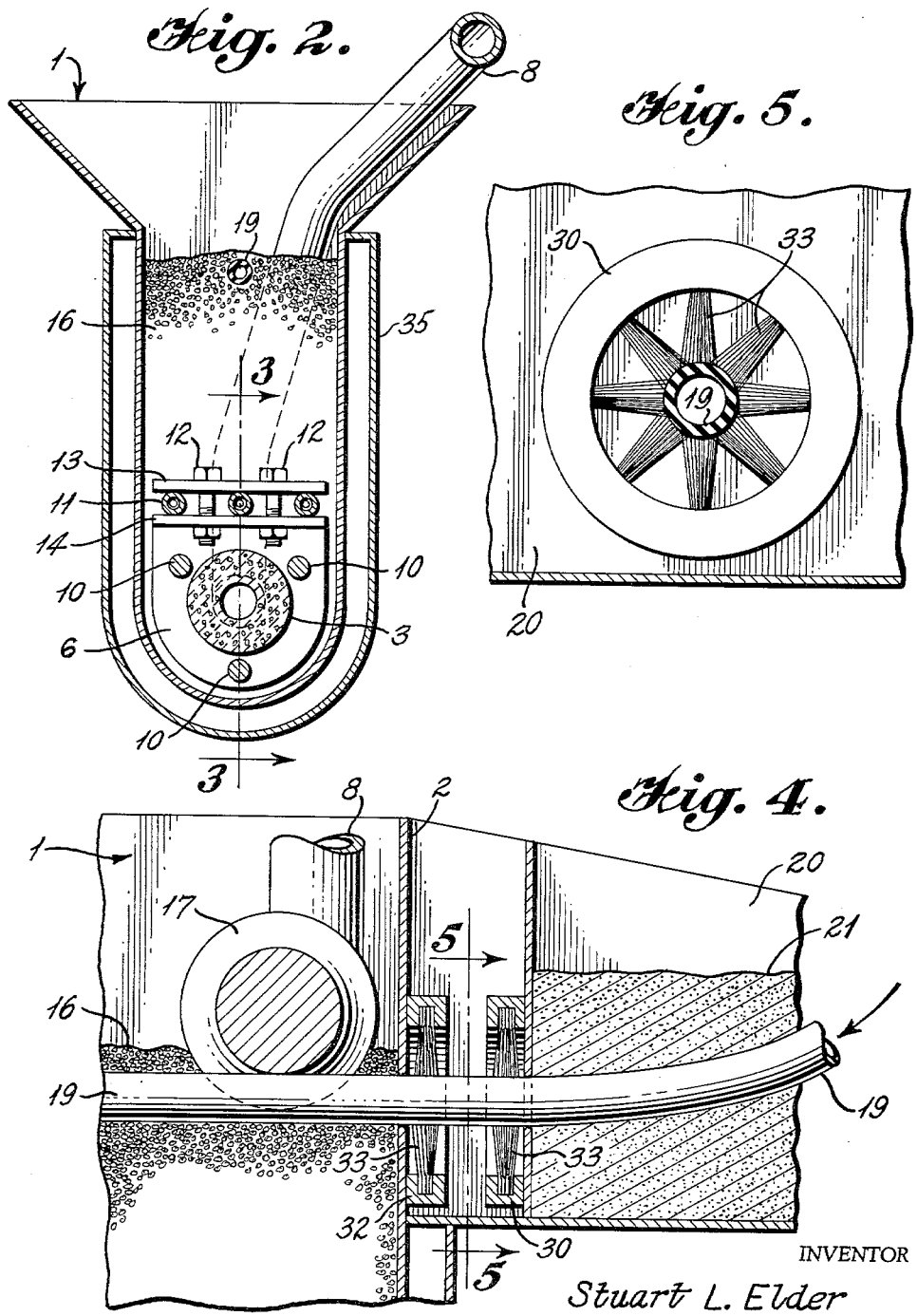

3,242,528
FLUID BEDS AND HEATING OR COOLING ARTICLES THEREBY
Stuart Leonard Elder, Coleshill, England, assignor to Dunlop Rubber Company Limited, London, England, a British company
Filed Jan. 23, 1963, Ser. No. 253,502
Claims priority, application Great Britain, Feb. 8, 1962, 4,814/62
11 Claims. (Cl. 18—6)

This invention relates to fluid beds and to the heating or cooling of articles thereby, a fluid bed consisting of a bed of fluidized solid material.

The term "fluidized solid material" is applied to a layer of small particles of a solid through which a current of gas or vapour is passed at such a rate and distribution that the particles are held in suspension and are able to move at random in the layer. When a bed of small particles is fluidized in this way it behaves like a liquid and heavy articles which normally remain on the surface of the bed when it is unfluidized and at rest sink rapidly when it is fluidized. A bed of such material effects rapid transfer of heat to or from objects immersed therein.

Methods and apparatus for heating or cooling articles immersed in a bed of fluidized solid material are known. In the apparatus previously proposed, the bed of fluidized solid material is held in a suitable container and the vessel is provided in its base with porous tiles upon which the bed lies and through which the fluidizing gas or vapour is passed.

Difficulty can be experienced with the use of porous tiles in the base of a fluidizing container upon which tiles the bed lies as a result of cracking of the tiles of the cement between the tiles caused by uneven thermal expansion or contraction between the container and tiles, the cracking allowing uneven fluidization to take place. The tiles then have to be replaced or repaired. In addition, extreme accuracy has to be ensured in the initial construction of the container and tiles to minimise this difficulty.

It is an object of the present invention to reduce or eliminate this difficulty.

According to the invention apparatus for treating an article in a bed of fluidizable solid material comprises a container for containing fluidizable solid material and at least one non-rotatable porous element having at least one cavity and at least one opening in the said element for the supply of fluidizing gas or vapour to the said cavity, the said element or elements being disposed within the container in a position to enable gas or vapour passing through the walls of the element to fluidize the said solid material.

According to the invention also a method of treating an article in a bed of fluidizable solid material comprises passing gas or vapour into at least one cavity formed in a non-rotatable porous element immersed in the bed, allowing the gas or vapour to pass through the walls of the element to the bed to effect fluidization thereof and immersing the article in or floating it upon the surface of the fluidized bed.

Preferably the porous element is a porous ceramic cylindrical tube, and a plurality of such cylindrical tubes are provided adjacent to one another in the container, the cavity in each tube being in communication with the cavity or cavities in the adjacent tube or tubes. Alternatively the porous element may be a block of porous ceramic material formed with a cavity or cavities, and a plurality of such blocks are provided adjacent to one another in the container, the cavity or cavities in each block being in communication with the cavity or cavities in the adjacent block or blocks.

The method and apparatus may be used for heating, e.g. to effect vulcanisation; for cooling or for drying material or articles in which case, heating or cooling means, as appropriate, are provided. Alternatively, the method and apparatus may be used for providing a uniform coating of plastic material on a hot former dipped in the fluidized solid material which, in this instance, would comprise the plastic material from which the coating is to be formed.

Means may be provided for supplying a continuous length of material e.g., rubber tube, rod, sheet or the like, or fabric, rubberised or not, to the apparatus, and heating means may be provided in order to change the temperature of an immersed portion of the material as it passes through the fluidized bed.

The fluidized bed can be heated or cooled by means of coils immersed therein or by circulating heating or cooling fluids through a suitable jacket around the container. It can also be heated by means of electrical heating elements immersed therein or arranged around the outer covering. The porous element or elements may be assembled together with heating elements in the form of a unit which can easily be removed from the container.

Solid materials which have been found suitable for use in fluidizable beds include sand, small glass spheres (small glass spheres) and shot blasting materials. The particles of the solid material to be fluidized preferably have a diameter less than 0.5 mm. but not less than 0.05 mm.

One embodiment of the invention in the form of apparatus for the continuous vulcanisation of extruded rubber tubing made of neoprene will now be described, by way of example, with reference to the accompanying drawings in which:

FIG. 1 is a vertical longitudinal section through the apparatus of the invention;

FIG. 2 is a vertical transverse section taken along line 2—2 of FIG. 1;

FIG. 3 is a fragmentary longitudinal section taken along line 3—3 of FIG. 2;

FIG. 4 is an enlargement of the tubing inlet zone of the container showing the chalk container and the associated brushes; and FIG. 5 is a vertical transverse section along lines 5—5 of FIG. 4.

Referring to the drawings, a container 1 for containing fluidizable solid material in the form of small glass spheres is in the form of a trough with a divergent opening, the opening being disposed in an uppermost position, and has end members 2. The container 1 is about 6 feet long and its base is about 3 inches wide.

A plurality of cylindrical porous ceramic tubes 3, each of 2 inches outside diameter, approximately ¾ of an inch inside diameter and each 10 inches long, are disposed end-to-end in the base of the container 1, the tubes being assembled together by four cylindrical tubular duralumin collars 4 of external diameter such that they are a loose fit within the tubes 3. Each of the collars connects the confronting ends of adjacent tubes 3 and is formed with a flange 5 extending radially outwardly between the said ends. No cement is required at the junctions between the tubes 3 and collars 4.

Opposite ends of the assembled tubes are provided with end plates 6 having pipe connections 7 which are connected to inlet pipe 8 which extend upwardly through the vessel 1 to a common connection 9 leading to means for supplying fluidizing air (not shown). The end plates 6 are connected together by three tensioning rods 10 extending longitudinally of and spaced around the tubes 3. Each rod 10 passes through corresponding holes in the end plates 6 and is tensioned by the tightening of nuts on screw-threaded portions of the rod projecting from the remote sides of the said plates 6. Hence the tension rods 10 hold the assembly of tubes 3, collars 4 and end plates 6 together.

In a position disposed above the assembled tubes 3 are located three electrical resistance heaters 11, each connected to the electrical power source as shown and capable of dissipating 1¾ kilowatts. The heaters 11 are supported in a common horizontal plane on the assembled tubes, their ends being clamped by nuts and bolts 12 between a plate 13 and a flange 14 extending axially and horizontally from the top of each end plate 6. The heaters 11 are also supported at intervals along their length by support plates 15 having flanges 14 and holes for the passage of the tensioning rods 10 identical to those provided on the end plates 6. Each support plate 15 is mounted upon the radially outer surface of a collar 4 between its flange 5 and the adjacent end of the adjoining tube 3, the said plate 15 being formed with a circular hole of diameter and disposition such that this can be done. The rods 10 pass through the respective holes in each support plate 15 and the heaters 11 are supported on the said plate by a plate 12 and nuts and bolts 13 in an identical way to that in which they are supported upon the end plates 6. Thus the heaters and tubes are secured together in a unit which may be easily removed from the container 1 should they require maintenance or attention.

The bed may also be heated or cooled by circulating heating or cooling fluids from an inlet as shown in FIG. 1, through a jacket 35 which extends around container 1, and outward through outlet 37.

The container 1 is supplied with small glass spheres 16 of approximately 0.25 mm. diameter so as to completely cover the tubes 3 and heaters 11 and freely rotatable rollers 17 are mounted transversely of the container to guide the neoprene tube before and after its passage along the surface of the small glass spheres.

The apparatus just described is mounted alongside the nozzle 18 of an extruder (not shown), of conventional design, for continuously extruding neoprene rubber tube 19 and supplying it, for vulcanisation, to the container 1.

A container 20 for french chalk 21 is disposed between the extruder nozzle 18 and the container 1 and guiding means (not shown) are provided to guide the tube 19 into the french chalk 21 on its way to the container 1 to give the tube 19 a coating of chalk so as to prevent adhesion of the small glass spheres 16 to the neoprene tube 19 while the tube is passing through the bed in a tacky state prior to vulcanisation in the bed. Brushes 30 and 32 are provided between the container 20 and adjacent guiding roller 17 to remove excess french chalk from the tube 19. Each brush consists of an annulus through which the tube 19 is passed, and has bristles or hairs 33 projecting radially inwardly therefrom and just coming into contact with the said tube 19.

A take-up spool 22 for the vulcanised neoprene tube 19 is located at the end of the container 1 remote from the extruder nozzle 18 and chalk container 20 so as to wind up the vulcanised neoprene tube 19 as it issues from the container 1.

The operation of the apparatus will now be described.

Fluidizing air is continuously supplied through the inlet pipes 8 to the porous tubes 3 at a pressure sufficient to enable the ballotini 16 contained within the container 1 to vigorously "boil," the air percolating evenly through the pores of the tubes 3 so that even fluidization of the small glass spheres bed is obtained.

The electric heating elements 11 are switched on to heat up the ballotini 16 to working temperature and they continue to heat the bed under the control of a thermostat (not shown) to maintain the working temperature. The power consumption to heat up the bed is 5¼ kilowatts for 45 minutes, the consumption reducing to about 3 kilowatts to maintain the bed at 250° centigrade.

Neoprene tube 19 of circular cross-section and about ¼" internal diameter is extruded from the extruder through the nozzle 18 and passes through the french chalk 21, between the brushes, under roller 17 in the container 1, along the surface of the bed of small glass balls 16 and over the second roller 27 to be wrapped on the take-up spool 22.

The tube 19 is heated by the bed to 250° centigrade while being extruded at a rate of about 2 ft. per minute with a length of about 6 ft. on the surface of the bed of small glass spheres 16 at any time.

The neoprene tube 19 is completely vulcanised in a continuous length during its passage through the bed of small glass spheres 16, the small glass spheres surging over the upper surface of the tube 19, and the method in accordance with the invention is both labor-saving and time-saving when compared with the conventional method of manufacture in batches of lengths of tubing vulcanised on trays in open steam within an autoclave.

A more rapid extrusion rate and, therefore, a greater output can be accommodated by increasing the length of the container 1 and thus the length of neoprene tube 19 on the bed surface at any given time. If the said length of neoprene tube 19 is doubled the extrusion rate may also be doubled and then the output of vulcanised neoprene will be twice as great, assuming all other conditions to remain the same.

It will be appreciated that, by the use of the porous ceramic tubes 3 in the manner described, expansion or contraction of the tubes may take place with a reduced danger of the tubes 3 cracking, the tension rods 10 and heaters 11 also expanding and contracting, any difference in the linear expansion of the tubes 3 and the rods 10 and heaters 11 being accommodated by a change in tension within the rods and heaters. In addition, no cement is required in the apparatus embodying the invention so that the difficulty experienced, in connection with the porous tiles being cemented into the bases of beds of fluidized solids as hitherto constructed, of the cement cracking is effectively removed.

In a modification of the embodiment of the invention described, the tension rods 10 may be dispensed with, particularly if only a few tubes 3 are provided in the bed, the tubes 3 being supported by the collars 4 and the heaters 11 connecting the tubes together.

Having now described my invention, what I claim is:

1. Apparatus for heat treating an article in a bed of fluidizable solid material comprising a container for containing fluidizable solid material, a plurality of porous tubes coaxially aligned within the container in a position to enable gas diffusing through the walls of the tubes to fluidize said solid material, and means connecting adjacent tubes to allow the free expansion of said tubes upon the passage of a fluidizing gas therethrough.

2. An apparatus according to claim 1 wherein said means comprises a collar communicating with adjacent tubes and having a radially extending flange separating adjacent ends of each pair of adjacent tubes, said fluidizing gas being passed through said collar to said tubes.

3. An apparatus according to claim 1 further comprising a plate disposed at each end of said assembled tubes and at least one parallel tension rod adjustably secured to said paltes to hold said tubes in axial compression.

4. Apparatus according to claim 1 wherein said tubes are porous ceramic cylindrical tubes.

5. Apparatus according to claim 1 wherein said tubes are porous ceramic blocks.

6. Apparatus according to claim 1 further comprising means for changing the temperature of the fluidizable solid material.

7. Apparatus according to claim 6 wherein said temperature changing means comprises an electrical heater located within the container in a position so as to be immersed by the fluidizable solid material.

8. Apparatus according to claim 7 wherein said electrical heater extends longitudinally of the non-rotatable porous element and is secured thereto.

9. Apparatus according to claim 6 wherein said temperature changing means comprises a jacket surrounding the container for containing the fluidizable solid material.

10. Apparatus according to claim 1 further comprising a plurality of guide rollers rotatably mounted on said container for guiding an article in the form of a continuous length of material along the surface of the bed of fluidizable solid material.

11. Apparatus according to claim 1 further comprising means located adjacent said container for applying a coat of chalk to said article as it passes into said container and means located between said container and said coat applying means to remove excess chalk from said article.

References Cited by the Examiner

UNITED STATES PATENTS

| | | | |
|---|---|---|---|
| 102,893 | 5/1870 | Warth et al. | 118—112 |
| 1,175,429 | 3/1916 | Frese | 134—64 |
| 1,643,999 | 10/1927 | Semple | 18—14 |
| 1,891,424 | 12/1932 | Kirkpatrick | 285—370 X |
| 1,957,791 | 5/1934 | McManis | 118—112 |
| 2,403,364 | 7/1946 | Hertzell et al. | 285—370 X |
| 2,723,054 | 11/1955 | Louden et al. | 222—195 |
| 2,785,478 | 3/1957 | Audas et al. | 34—9 |
| 3,047,418 | 7/1962 | Compton | 118—429 X |
| 3,053,704 | 9/1962 | Munday | 148—20.3 |
| 3,061,941 | 11/1962 | Goy et al. | 34—48 |
| 3,072,968 | 1/1963 | Watson et al. | 18—6 XR |

WILLIAM J. STEPHENSON, *Primary Examiner.*

WILLIAM D. MARTIN, *Examiner.*